May 1, 1951     C. M. JOSLYN     2,550,728
DROP CENTER TIRE CASING MOUNTING MACHINE
Filed June 20, 1945     2 Sheets-Sheet 1
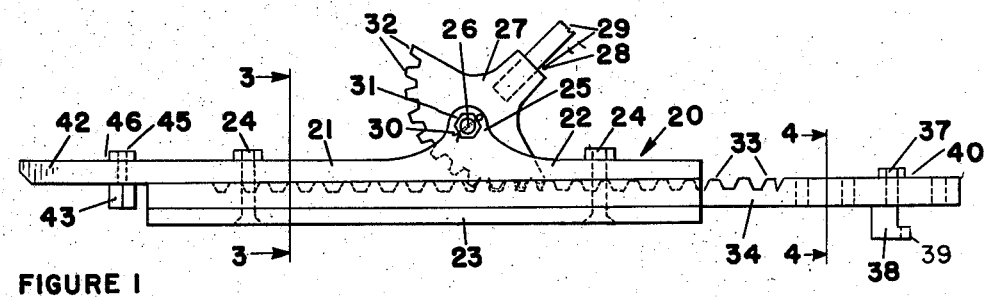
FIGURE 1
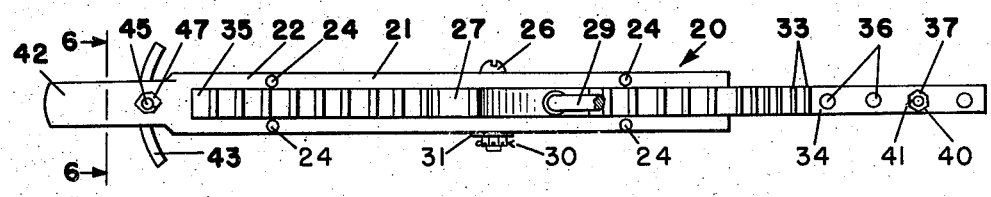
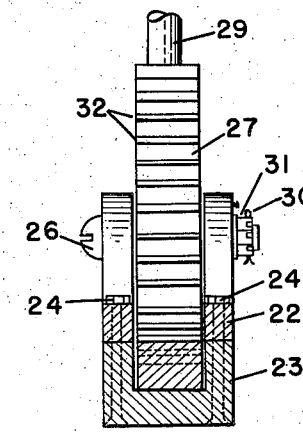
FIGURE 2
FIGURE 3
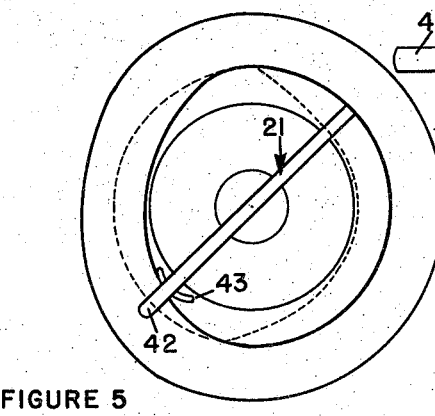
FIGURE 5
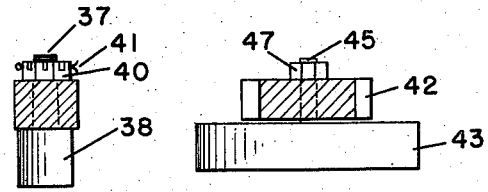
FIGURE 4     FIGURE 6
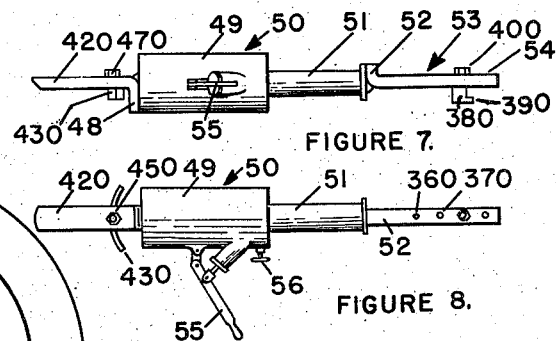
FIGURE 7
FIGURE 8
INVENTOR.
CHARLES M. JOSLYN
BY *Victor J. Evans & Co.*
ATTORNEYS May 1, 1951 C. M. JOSLYN 2,550,728
DROP CENTER TIRE CASING MOUNTING MACHINE
Filed June 20, 1945 2 Sheets-Sheet 2

INVENTOR.
CHARLES M. JOSLYN
BY *Victor J. Evans & Co.*
ATTORNEYS

Patented May 1, 1951

2,550,728

UNITED STATES PATENT OFFICE 2,550,728

DROP CENTER TIRE CASING MOUNTING MACHINE

Charles M. Joslyn, Great Falls, Mont.

Application June 20, 1945, Serial No. 600,616

2 Claims. (Cl. 157—1.1)

This invention relates to a drop center tire casing mounting machine, and is more particularly concerned with a device that is utilized for installing a tire on a rim or wheel.

Considerable difficulty has been heretofore experienced in installing a tire on a rim by the use of tire irons and rubber hammers, which tend to tear and mar the bead of the tire causing irreparable damage and shortening the life of the tire.

The present invention therefore contemplates the provision of a device that can be operationally associated with vehicle and auto tires and wheels for expeditiously and conveniently installing a tire on the wheel with a minimum amount of time and effort and without the disastrous results previously experienced.

One of the objects of the invention therefore is to provide a device which can be constructed of comparatively few and durable parts that are rigidly related when assembled so as to withstand considerable abuse while being employed in the capacity for which it was devised.

Another object of the invention is to provide a device that will install tires on airplane wheels as well as vehicle wheels.

Other features and advantages will become more readily apparent from the following description and the accompanying illustrative drawings.

In the accompanying drawings wherein a preferred embodiment of the invention is illustrated and like reference characters are employed to designate like parts throughout the views Fig. 1 is a side elevational view of such embodiment of the invention.

Fig. 2 is a top plan view of the same.

Fig. 3 is a longitudinal sectional view taken on the line 3—3 of Fig. 1.

Fig. 4 is the same taken on line 4—4 of Fig. 1.

Fig. 5 shows principle of operation and how force is applied to tire bead.

Fig. 6 is a transverse sectional view on the line 6—6 of Fig. 2.

Fig. 7 is a top plan view of a modification of the device showing the use of a hydraulic jack to operate the same.

Fig. 8 is a side view thereof.

Fig. 9 is a top plan view of the upper section of the gear sector and bead grip frame.

Fig. 9a is an end view of Figure 9.

Fig. 10 is a top plan view of the bottom section of the gear sector and bead grip frame.

Figure 10a is an end view of Figure 10.

Fig. 11 is a top plan view of the pinion rack.

Figure 11a is a side view of Figure 11 and Figure 11b is an end view of Figure 11.

Fig. 12 is a side view of an adapter for using large model machine on smaller rims and wheels.

Figure 12a is a top plan view of Figure 12.

Fig. 13 is a side view of an anchor hook adapter for wire spoked wheels.

Figure 13a is a side view of an anchor hook adapted for tractor rims.

Fig. 14 is a side view of an adapter for a bead hold down attachment.

Figure 14a is a top plan view of Figure 14.

Fig. 15 is a modification of the device showing the gear sector and bead grip frame cast in one piece and Figure 15a is a sectional view on the line 15a—15a of Figure 15 and Figure 15b is a top plan view of the pinion rack used in the form shown in Figure 15.

Fig. 16 is another modification of the device showing the use of a tubular gear sector and bead grip frame.

Figure 16a is an end view of a tubular or circular pinion rack.

Figure 16b is a top plan view of Figure 16a and Figure 16c is a side view of Figure 16a.

Referring now more in detail to the drawings the machine is designated in its entirety by the numeral 20. The machine in the main comprises a gear sector and bead frame 21 having an upper plate section 22 and a lower channel section 23 removably secured together by bolts and nuts 24.

The upper plate section 22 is provided with extensions or ears 25 for suitably supporting pivotal means such as a screw-threaded shear pin or shaft 26, the latter rotatably supporting a spur gear sector 27, having a handle receiving opening 28 therein adapted to receive a handle 29. The pin or shaft 26 being retained in place by a cotter key 30 and a complementary threaded nut 31.

The spur gear sector 27 is suitably provided with teeth 32 which are adapted for cooperation with teeth 33 of the pinion rack 34 through the opening 35 provided in the upper plate section 22 of the frame 21. By operating the handle 29 the pinion rack 34, which is slideably retained in the channel section 23 of the frame 21, can be actuated lengthwise of the frame 21.

The teeth 32 are so arranged with respect to the pinion rack 34 that if the handle 29 is rotated downwardly into a horizontal position the last tooth of the gear sector 27 will clear the teeth 33 of the pinion rack 34 whereby the latter is movable independently of the teeth 32 on the gear sector 27.

The pinion rack 34 is provided with a plurality of circular openings 36 which are adapted to receive an upwardly extending screw-threaded stem portion 37 of a wheel or rim anchor hook 38 which is adapted to position the frame 21 in abutting engagement with a fixed portion of a vehicle wheel. The hook is so shaped that it has a forwardly extending portion 39 which is adapted to fit under the flange of the wheel when the machine 20 is being operated.

The pinion rack 34 is provided with a plurality of the openings 36 to adapt the machine to tires of various sizes and the hook is retained in position in the openings 36 in the rack 34 by means of a nut 40 being threaded on to complementary threads formed on the end of the stem portion 37 and a cotter pin 41.

The upper plate section 21 has a handle portion 42 formed on one end thereof and the handle portion 42 extends beyond the extremities of the lower channel section 23.

An accurate tire bead grip 43 is provided with an extension or ear 44 for suitably supporting a pivotal shaft 45 formed integral therewith. The screw-threaded shaft 45 is adapted to be received in a shaft conforming opening 46 in the handle portion 42 of the upper plate section 21. The shaft 45 is retained in place by a complementary threaded nut 47.

Therefore when the anchor hook 38 is in contact with the wheel W the bead grip 43 is in contact with the bead of the tire T and operation backward and forward of the handle 29 will force the pinion rack 34 endwise applying pressure to the bead of the tire by means of the grip 43 and force the tire bead over the wheel rim.

By this method the tire will be installed on the wheel without the use of the usual tire irons and rubber hammer and without damage to the tire bead or walls of the tire.

In the modification shown in Fig. 15 the machine 20' includes the frame 21' which is cast of one piece and the bead grip 43' is formed integral with the frame 21'.

In the modification shown in Fig. 16 the machine 20'' includes the frame 21'' which is tubular in cross section and the pinion rack 34'' will be circular and have a circumference smaller than the inner circumference of the tubular frame 21''.

In all instances the machine will operate the same. Various modifications of the anchor hook 38 are shown in the views 12 to 14a inclusive.

In Figs. 12 and 14 the hooks 38a and 38d are provided with recesses 48a and 48d respectively for use with cast airplane wheels in order that the adapter may straddle a reinforcing rib under the wheel flange.

Hydraulic and air cylinders and the like can be used to operate the device as shown in Figs. 7 and 8. In this instance the handle portion 420 is bent at right angles to form a depending arm 48 which is secured to the body 49 of a hydraulic jack 50 in any well known manner. The tire bead grip 430 is fastened to the portion 420 as previously described. To the end of the jack plunger 51 is secured the upstanding portion 52 of the rim anchor hook receiving member 53. The straight portion 54 of member 53 is formed at right angles to the portion 52 and is provided in the same manner as the end of the rack 34 with openings 360 to receive the rim anchor hook 380. The jack 50 is operated in the usual manner by the handle 55 and has the usual release valve 56.

There is thus provided a device which can be used on the big wheels of airplanes, tractors, and industrial machinery as well as automobile wheels.

It is to be understood that other means may be employed to operate the device, therefore, it is not intended to be limited to the manner for operating the machine illustrated and described but only insofar as the same is so limited in the appended claims forming a part of this specification.

Having thus described the invention what is claimed as new and desired to be secured by Letters Patent is:

1. A device of the character described comprising a frame, said frame having a longitudinal split upper plate, a lower channel member and means for securing said members into operative relationship with each other, a pressure applying bar slidably mounted in said frame, rack teeth on the upper surface of said bar, transversely spaced and aligned upstanding ears on said upper plate, a sector shaped means pivotally mounted between the upstanding ears on the upper plate on the frame, pinion teeth on said sector shaped means forming an operating connection between said pressure bar and said sector shaped means, a handle formed on said sector shaped means, the teeth on the bar and the teeth on the sector shaped means being so arranged that when the handle is in a horizontal position the teeth are disengaged whereby the bar is slidable independently of the sector shaped means, means on the outer end of said bar projecting from the lower surface thereof and at right angles thereto for contacting a vehicle wheel, and arcuate means connected to said frame adapted for pivotal movement in a plane parallel to the bottom of the frame and to contact the bead of a vehicle tire.

2. The invention as described in claim 1 having the additional feature whereby the means projecting from the lower surface of said pressure applying bar is formed of a pivotal shaft, a body portion and a portion extending from the body portion in horizontal relationship with the axis of the frame.

CHARLES M. JOSLYN.

REFERENCES CITED

The following references are of record in the file of this patent:

UNITED STATES PATENTS

| Number | Name | Date |
| --- | --- | --- |
| 1,129,487 | Hart | Feb. 23, 1915 |
| 1,178,481 | Roland | Apr. 4, 1916 |
| 1,414,879 | Hughes | May 2, 1922 |
| 1,470,095 | Murray | Oct. 9, 1923 |
| 1,547,544 | Wertz | July 28, 1925 |
| 1,917,585 | Hill et al. | July 11, 1933 |
| 2,419,352 | Heitzman | Apr. 22, 1947 |